3,652,531
R-GLYCYL-L-TRYPTOPHYL-L-METHIONYL-GLYCINE AMIDES AND PREPARATION THEREOF

Munetugu Miyoshi, Nishinomiya-shi, Kouichi Niwa, Ikeda-shi, Takanobu Ohnishi, Osaka-shi, Tamotsu Danno, Moriguchi-shi, and Koh Higaki, Nara-shi, Japan, assignors to Tanabe Seiyaku Co., Ltd., Osaka, Japan
No Drawing. Filed Aug. 22, 1969, Ser. No. 852,492
Claims priority, application Japan, Aug. 24, 1968, 43/60,772
Int. Cl. C07c *103/52*
U.S. Cl. 260—112.5    6 Claims

ABSTRACT OF THE DISCLOSURE

A glycyl-L-tryptophyl-L-methionyl-glycine ester having a protected terminal α-amino group is amidated. A glycyl-L-tryptophyl - L - methionyl-glycine amide having a protected terminal α-amino group is produced. This compound inhibits gastric juice secretion. The terminal α-amino group is protected with an alkyl carbonyl, an alkoxycarbonyl, an aralkoxycarbonyl or an arylsulfonyl group.

---

This invention relates to novel tetrapeptide amides and to a process for preparing same. More particularly, it relates to a glycyl-L-tryptophyl-L-methionyl-glycine amide having a protected terminal α-amino group.

Groups which may be used to protect the terminal α-amino group include an acyl group, for example, an alkylcarbonyl group (e.g., acetyl, propionyl, butyryl group), an alkoxycarbonyl group (e.g., ethoxycarbonyl, isobutoxycarbonyl, t-butoxycarbonyl, t-amyloxycarbonyl group), an aralkoxycarbonyl group (e.g., carbobenzoxy group) or an arylsulfonyl group (e.g., tosyl group).

It has been found that the tetrapeptide amides, of this invention, having a protected terminal α-amino group show a remarkable inhibitory effect against the secretion of gastric juice. It has also been found that these compounds are useful in the treatment of gastric ulcers. For example, N - butoxycarbonyl - glycyl - L - tryptophyl-L-methionyl-glycine amide produces an excellent secretory inhibition of gastric juice when the compound is administered either enterally or parenterally. This fact is shown by an experiment (the results of which are shown in Table I), wherein tetragastrin (chemical name: N-t-amyloxycarbonyl-L-tryptophyl - L - methionyl - L - aspartyl-L-phenylalanine amide) was injected intravenously at a dose of 5 mg./kg./hr. in Heidenhain pouch dogs of 7–12 kg. body weight in order to keep the gastric secretion at a constant level. The respective compounds tabulated in Table I were then injected intravenously into said dogs over a one hour period. The inhibition ratio (percent) of gastric secretion was measured.

Accordingly, it is clear that the gastric secretion inhibitory activity of N-t-butoxycarbonyl-glycyl-L-tryptophyl-L-methionyl-glycine amide at a dose of 10 mg./kg./hr. is approximately equal to that of secretin at a dose of 4 units/kg./hr.

The anti-ulcer activity of the compounds of this invention is shown by the following experiments (the results are shown in Table II and III):

Shay's rat ulcer.—The respective compounds tabulated in Table II are subcutaneously administered to rats once a day for 6 consecutive days. The rats are then fasted for 48 hours, fixed and pylorus ligation is performed. 18 hours later the rats are sacrificed and their stomachs are removed and examined. The degree of ulceration and ulcer scores are observed.

TABLE II

| Compounds | Shay's rats ulcer | |
|---|---|---|
| | Dose (mg./kg.) | Preventive ratio |
| N-t-butoxycarbonyl-glycyl-L-tryptophyl-L-methionyl-glycine amide. | 5 | ± |
| Do | 10 | + |
| Do | 20 | ++ |
| N-t-amyloxycarbonyl-glycyl-L-tryptophyl-L-methionyl-glycine amide. | 10 | ++ |
| N-acetyl-glycyl-L-tryptophyl-L-methionyl-glycine amide. | 20 | ++ |
| N-iso-butoxycarbonyl-glycyl-L-tryptophyl-L-methionyl-glycine amide. | 20 | ++ |
| N-ethoxycarbonyl-glycyl-L-tryptophyl-L-methionyl-glycine amide. | 50 | + |
| Glutamine | 50 | ± |

NOTE.—Preventive ratio (percent) against ulceration; (++): >75% (+): 50-75%; (±): 25-50%.

Reserpine ulcer.—The rats are fasted for 24 hours. The respective compounds tabulated in Table III and 5 mg./kg. of reserpine are then subcutaneously administered to them. 18 hours later the rats are sacrificed. The stomachs are removed, opened and the ulcerative bleedings thereof are observed.

Stress ulcer.—The rats are fasted for 24 hours. They are then fixed on their backs, by the limbs, on boards and immersed to the depth of their xiphoid in water which is kept at about 20° C. The respective compounds tabulated in Table III are subcutaneously injected one hour before the application of the above stress. After giving the above stress for 20 hours, the rats are sacrificed and their stomachs are removed and examined.

TABLE III

| | Reserpine ulcer | | Stress ulcer | |
|---|---|---|---|---|
| | Dose (mg./g.) | Preventive ratio | Dose (mg./kg.) | Preventive ratio |
| N-t-butoxycarbonyl-glycyl-L-tryptophyl-L-methionyl-glycine amide | 5 | — | 10 | — |
| Do | 10 | ± | 25 | + |
| Do | 20 | ++ | 50 | + |
| N-t-amyloxycarbonyl-glycyl-L-tryptophyl-L-methionyl-glycine amide | | | 25 | + |
| Glutamine | 100 | — | 100 | — |

NOTE.—Preventive ratio (percent) against ulceration: (++):>75%; (+):50-75%; (±) 25-50%; (—): 25%.

TABLE I

| | | Inhibition ratio (percent) | | | | |
|---|---|---|---|---|---|---|
| Compounds | Dose | Gastric juice | Total acid | Free acid | Chlorine | Pepsin |
| N-t-butoxycarbonyl-glycyl-L-tryptophyl-L-methionyl-glycine amide. | 0.1 mg./kg./hr | 23 | 23 | 23 | 21 | 0 |
| Do | 0.5 mg./kg./hr | 31 | 36 | 36 | 43 | 25 |
| Do | 10.0 mg./kg./hr | 55 | 63 | 64 | | |
| Secretin | 4 units/kg./hr | 51 | 62 | 64 | 30 | 40 |

The intravenous administration of N-t-butoxycarbonyl-glycyl-L-tryptophyl-L-methionyl-glycine amide at a daily dose of 15–50 mg. for a period of one to two months, or the oral administration of said compound at a daily dose of 0.5–2.5 g. for a period of one to two months to adult patients suffering from gastric and duodenal ulcers resulted in the relief of such subjective symptoms as epigastric paint, anorexia and heart burn.

Furthermore, the compounds of the present invention are less toxic. When said compounds were given orally to mice the $LD_{50}$ was more than 5000 mg./kg. When given intravenously, the $LD_{50}$ was more than 300 mg./kg.

According to the present invention, the novel tetrapeptide amides can be prepared by amidation of glycyl-L-tryptophyl-L-methionyl-glycine esters which have a protected terminal $\alpha$-amino group. Relevant esters of the tetrapeptide are esters with lower alkyl groups having up to 6 carbon atoms (e.g., a methyl, ethyl, propyl or butyl group) or benzyl esters which may be unsubstituted or substituted with, for example, a nitro group, a methyl group, a methoxy group or a halogen atom. The amidation can be carried out by treating the tetrapeptide ester with ammonia in a solvent as, for example, an alcoholic solvent. The reaction is preferably carried out at a low temperature. The reaction solvent is removed. The residue thus obtained is recrystallized from a suitable solvent to give the corresponding pure tetrapeptide amide. Ethyl acetate, alkanols, aqueous alkanols, etc. may be used as the recrystallization solvent.

Glycyl-L-tryptophyl-L-methionyl-glycine ester having a protected terminal $\alpha$-amino group can be prepared using conventional methods for the preparation of peptides. The amino acids are condensed together in the afore-mentioned sequence, either singly or after having formed small peptide units, while protecting the functional groups which do not participate in the reaction. Various means may be employed for the protection of functional groups depending upon the kind of condensation reaction. For the protection of amino groups, N-acylation is preferred and acyl groups illustrated hereinbefore are employed for this purpose. The amino group of methionine is, however, preferably protected by a group which can be easily eliminated by hydrolysis (e.g., an isobutoxycarbonyl, a t-butoxycarbonyl, a t-amyloxycarbonyl or an orthonitrosulfenyl group).

During the reaction of this process the carboxyl group is preferably protected by esterification. Thus forming the alkyl ester (e.g., methyl ester, ethyl ester) or the aryl ester (e.g., benzyl ester). The desired peptide ester is formed either by the stepwise method or the fragment condensation method: with the latter method, any combination of the fragments can be employed. The condensation reaction can be accomplished by a conventional manner. For example, the tetrapeptide ester compounds of this invention may be prepared by the carbodiimide method, the azide method, the method of the activated ester or the mixed anhydride method. The condensation reaction in the first three mentioned methods is preferably carried out at a temperature lower than 0° C., especially at −5 to −10° C. With the last mentioned method, it is preferably carried out at room temperature. Inert solvents such as chloroform, dichloromethane, tetrahydrofurane, dioxane and dimethylformamide may be used as the solvent for these reactions. The conversion of the protected amino group into the free group, and the conversion of the modified carboxyl group into the free carboxyl group during the reaction of this process can be effected by an appropriate procedure. The procedure that is employed depends upon the kind of protective group present. Typical procedures for removal of the protective group are as follows: catalytic hydrogenation or treatment with hydrogen bromide in acetic acid when a benzyloxycarbonyl group is employed as the protective group; treatment with mineral acid (e.g., hydrochloric acid) at room temperature when a t-butoxycarbonyl or a t-amyloxycarbonyl group is employed as the protective group; treatment with sodium in liquid ammonia when a tosyl group is employed as the protective group; treatment with sodium hydroxide at room temperature when the carboxyl group is esterified.

According to one embodiment of the invention, a glycyl-L-tryptophyl-L-methionyl-glycine ester, in which the terminal $\alpha$-amino group is protected, can be prepared by condensing glycine ester with a L-tryptophyl-L-methionyl azide having a protected terminal $\alpha$-amino group. The protective group of the terminal $\alpha$-amino group is then eliminated by an appropriate procedure as described above. The resulting tripeptide ester is then condensed with glycine having a protected $\alpha$-amino group in the presence of dicyclohexylcarbodiimide.

According to another embodiment of the invention, a glycyl-L-tryptophyl-L-methionyl-glycine ester, in which the terminal $\alpha$-amino group is protected, can be prepared by condensing in the presence of dicyclohexylcarbodiimide, an L-tryptophyl-L-methionine ester with glycine having a protected amino group. The resulting tripeptide ester is treated with hydrazine and succeedingly with nitrous acid to give a glycyl-L-tryptophyl-L-methionyl-azide having a protected terminal $\alpha$-amino group. This product is condensed with glycine ester.

According to a further embodiment of the invention, a glycyl-L-tryptophyl-L-methionyl-glycine ester, in which the terminal $\alpha$-amino group is protected, can be prepared by condensing a L-tryptophyl-L-methionyl-glycine ester with a glycine p-nitrophenyl ester having a protected terminal $\alpha$-amino group.

Practical and presently-preferred embodiments of the present invention are shown in the following examples. These examples are given only for the purpose of illustrating the present invention and not for the purpose of limiting same.

EXAMPLE 1

(1) 13.5 g. of N-t-butoxycarbonyl-L-tryptophyl-L-methionine hydrazide is dissolved in 200 ml. of dimethylformamide. The hydrazide is converted to the azide by reaction at −10° C. with nitrous acid generated by the dropwise addition of 42 ml. of 10% hydrochloric acid.

3.8 g. of glycine methyl ester hydrochloride is dissolved in 80 ml. of chloroform. This solution is neutralized with triethylamine and the solution obtained by the preceding process is added dropwise to it at −10° C. After standing overnight, the solution is extracted with a mixture of chloroform and water. The chloroform layer is washed with 1% hydrochloric acid and an aqueous solution of 5% sodium bicarbonate. The chloroform solution is dried and evaporated to remove the solvent. The resulting crystals are recrystallized from ethyl acetate-petroleum ether to give 11 g. of N-t-butoxycarbonyl-L-tryptophyl-L-methionyl-glycine methyl ester. M.P. 135–137° C. Yield: 72.4%. $[\alpha]_D^{20}$ −16.06° (c.=1, methanol).

Analysis.—Calculated for $C_{24}H_{34}O_6N_4S$ (percent): C, 56.90; H, 6.77; N, 11.06; S, 6.39. Found (percent): C, 56.57; H, 6.86; N, 10.83; S, 6.36.

(2) 5 g. of N-t-butoxycarbonyl-L-tryptophyl-L-methionyl-glycine methyl ester are dissolved in 10 ml. of 8% hydrochloric acid in methanol. After standing for an hour, the solution is mixed with ether and the resulting oil is separated therefrom. The oil thus obtained is washed several times with ether and dried to give L-tryptophyl-L-methionyl-glycine methyl ester hydrochloride as an oil.

(3) 1.6 g. of N-t-butoxycarbonyl-glycine is dissolved in 20 ml. of chloroform. 2.2 g. of dicyclohexylcarbodiimide are added to this solution while cooling to 0° C. and under stirring. A solution of 4.4 g. of L-tryptophyl-L-methionyl-glycine methyl ester and 1.6 ml. of trimethylamine in chloroform are then added to the above solution at the same temperature. After stirring for 6 hours, the chloroform solution is allowed to stand for a night at room temperature. The solution is washed with 1% hydrochloric acid, an aqueous solution of 5% sodium bicarbonate and dried. The solution is evaporated to remove the solvent. The residue thus obtained is dissolved in ethyl acetate and insoluble material is removed by filtration. The solution is evaporated to remove the solvent. 4.5 g. of N-t-butoxycarbonyl-glycyl-L-tryptophyl-L-methionyl-glycine methyl ester crystals are obtained. Yield: 80%. The crystals are recrystallized from ethyl acetate to give crystals melting at 182–183° C. $[\alpha]_D^{20}$ −25.24° (c.=1, methanol).

Analysis.—Calculated for $C_{26}H_{37}N_5S$ (percent): C, 55.40; H, 6.62; N, 12.43; S, 5.68. Found (percent): C, 55.56; H, 6.76; N, 12.27; S, 5.67.

(4) 2.8 g. of N-t-butoxycarbonyl-glycyl-L-trpytophyl-L-methionyl-glycine methyl ester are dissolved in 200 ml. of 30% ammonia-methanol and the solution is allowed to stand for a day in a refrigerator. The solution is evaporated at a temperature below 40° C. and under reduced pressure to remove the solvent. The residue thus obtained is recrystallized from ethyl acetate to give 2.4 g. of N-t-butoxycarbonyl - glycyl-L-tryptophyl-L-methionyl-glycine amide. M.P. 124–127° C. Yield: 90%. $[\alpha]_D^{20}$ −11.66 (c.=1, dimethylformamide) $[\alpha]_D^{20}$ −32.4 (c.=1, methanol).

Analysis.—Calculated for $C_{25}H_{36}O_6N_6S$ (percent): C, 54.74; H, 6.62; N, 15.32; S, 5.83. Found (percent): C, 54.42; H, 6.89; N, 15.17; S, 5.68.

EXAMPLE 2

(1) 1.6 g. of N-t-butoxycarbonyl-glycine and 3.9 g. of L-tryptophyl-L-methionine methyl ester are treated as described in Example 1–(3) (i.e. by the carbodiimide method). 3.5 g. of N-t-butoxycarbonyl-glycyl-L-tryptophyl-L-methionine methyl ester are obtained. Yield: 70% The crystals are recrystallized from methanol to give crystals melting at 143–145° C.

(2) 5.0 g. of N-t-butoxycarbonyl-glycyl-L-tryptophyl-L-methionine methyl ester are dissolved in 25 ml. of methanol. 5 ml. of hydrazine hydrate is added to the solution. The solution is allowed to stand overnight at room temperature. Water is added to the reaction solution and the precipitated crystals are collected by filtration. The crystals thus obtained are recrystallized from methanol-water to give 4.6 g. of N-t-butoxycarbonyl-glycyl-L-tryptophyl-L-methionine hydrazide. M.P. 185–187° C. Yield: 92% $[\alpha]_D^{20}$ −28.71 (c.=1, ethanol).

(3) 4.0 g. of N-t-butoxycarbonyl-glycyl-L-tryptophyl-L-methionine hydrazide and 1.1 g. of glycine methyl ester hydrochloride are treated as described in Example 1–(1) (i.e. by the azide method) to give N-t-butoxycarbonyl-glycyl-L-tryptophyl-L-methionyl-glycine methyl ester crystals. M.P. 182–183° C.

(4) N-t-butoxycarbonyl-glycyl - L - tryptophyl - L-methionyl-glycine methyl ester is treated as described in Example 1–(4) to give N-t-butoxycarbonyl-glycyl-L-tryptophyl-L-methionyl-glycine amide.

EXAMPLE 3

N-ethoxycarbonyl-glycine, N-t-butoxycarbonyl-L-tryptophyl-L-methionine and glycine methyl ester are treated as described in Example 1 to give N-ethoxycarbonyl-glycyl - L - tryptophyl-L-methionyl-glycine amide. M.P. 144–146° C. $[\alpha]_D^{20}$ −7.1° (c.=1, acetic acid).

Analysis.—Calculated for $C_{23}H_{32}O_6N_6S$ (percent): C, 53.07; H, 6.02; N, 16.15. Found (percent): C, 52.64; H, 6.35; N, 15.72.

EXAMPLE 4

N-ethoxycarbonyl-glycine, N-t-butoxycarbonyl-L-trypmethionine and glycine methyl ester are treated as described in Example 1 to give N-acetyl-glycyl-L-trpytophyl-L-methionyl-glycine amide. M.P. 217–219° C. $[\alpha]_D^{20}$ −25.1° (c.=1, dimethylformamide).

Analysis.—Calculated for $C_{22}H_{30}O_5N_6S$ (percent): C, 53.87; H, 6.17; N, 17.13. Found (percent): C, 53.41; H, 6.12; N, 16.55.

EXAMPLE 5

N-amyloxycarbonyl-glycine, N-butoxycarbonyl-L-tryptophyl-L-methionine and glycine methyl ester are treated as described in Example 1 to give N-amyloxycarbonyl-glycyl-L-tryptophyl-L-methionyl-glycine amide. M.P. 172–175° C. $[\alpha]_D^{20}$ −10.6 (c.=1, dimethylformamide).

EXAMPLE 6

5.1 g. of t-butoxycarbonyl-L-tryptophyl-L-methionyl-glycine methyl ester are dissolved in 10 ml. of 8% hydrochloric acid in methanol. After standing for an hour, the solution is evaporated to remove the solvent. The residue thus obtained is dissolved in 20 ml. of chloroform and the solution is neutralized with triethylamine. Then a solution of 4.5 g. of iso-butoxycarbonyl-glycine p-nitrophenyl ester in 20 ml. of chloroform is added to the above solution at 10° C. and under stirring. After standing overnight, the solution is washed with 10% hydrochloric acid, 5% sodium bicarbonate, water and dried. The solution is evaporated under reduced pressure to remove the solvent. The residue thus obtained is dissolved in ethyl acetate and petroleum ether is added to the solution to precipitate the crystals. The resulting crystals are recrystallized from ethanol-ethyl acetate to give 7.3 g. of N - iso - butoxy - carbonyl-glycol-L-triyptophenyl-L-methionyl-glycine methyl ester. M.P. 162–164° C. $[\alpha]_D^{20}$ −23.0° (c.=1, methanol).

Analysis.—Calculated for $C_{26}H_{37}N_5S$ (percent): C, 55.40; H, 6.62; N, 12.43. Found (percent): C, 55.55; H, 6.69; N, 12.12.

N - iso - butoxycarbonyl - glycyl - L-tryptophyl-L-methionyl-glycine methyl ester is treated as described in Example 1–(4) and the residue thus obtained is recrystallized from ethanol-ethyl acetate to give N-iso-butoxycarbonyl - glycyl - L - tryptophyl-L-methionyl-glycine amide. M.P. 205–206° C. $[\alpha]_D^{20}$ −6.15° (c.=1, acetic acid).

Analysis.—Calculated for $C_{25}H_{36}O_6N_6S$ (percent): C, 54.74; H, 6.62; N, 15.32. Found (percent) C, 54.32; H, 6.59; N, 15.04.

What we claim is:

1. R - glycyl - L-tryptophyl-L-methonyl-glycine amide wherein R is selected from the group consisting of acetyl, ethoxycarbonyl, isobutoxycarbonyl, t-butoxycarbonyl and t-amyloxycarbonyl.

2. N - t - butoxycarbonyl - glycyl-L-tryptophyl-L-methionyl-glycine amide.

3. N - iso - butoxycarbonyl - glycyl-L-tryptophyl-L-methionyl-glycine amide.

4. N - t - amyloxycarbonyl - glycyl-L-tryptophyl-L-methionyl-glycine amide.

5. N - acetyl - glycyl - L - tryptophyl-L-methionyl-glycine amide.

6. N - ethoxycarbonyl - glycyl - L - tryptophyl-L-methionyl-glycine amide.

References Cited

UNITED STATES PATENTS

| 3,247,179 | 4/1966 | Schwyzer et al. | 260—112.5 |
| 3,341,510 | 9/1967 | Chillemi et al. | 260—112.5 |
| 3,371,080 | 2/1968 | Boissonnas et al. | 260—112.5 |

FOREIGN PATENTS

| 1,042,487 | 9/1966 | Great Britain | 260—112.5 |

OTHER REFERENCES

Sandrin et al., Helv. Chim. Acta 47, 417 (1964).

LEWIS GOTTS, Primary Examiner

M. M. KASSENOFF, Assistant Examiner

U.S. Cl. X.R.

424—177